US012313104B2

(12) United States Patent
Trott et al.

(10) Patent No.: US 12,313,104 B2
(45) Date of Patent: May 27, 2025

(54) HYDRAULIC ARRANGEMENT WITH LOAD-HOLDING FUNCTION AND HYDRAULIC ARRANGEMENT CONTROL METHOD

(71) Applicant: Robert Bosch GmbH, Stuttgart (DE)

(72) Inventors: Alexander Trott, Karlstadt (DE); Manuel Rumpel, Karlstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/492,881

(22) Filed: Oct. 24, 2023

(65) Prior Publication Data

US 2024/0141932 A1 May 2, 2024

(30) Foreign Application Priority Data

Oct. 27, 2022 (DE) ..................... 10 2022 211 393.4

(51) Int. Cl.
*F15B 7/00* (2006.01)
*F15B 11/00* (2006.01)
*F15B 21/08* (2006.01)

(52) U.S. Cl.
CPC .............. *F15B 7/006* (2013.01); *F15B 7/003* (2013.01); *F15B 11/003* (2013.01); *F15B 21/08* (2013.01);
(Continued)

(58) Field of Classification Search
CPC .. F15B 7/003; F15B 7/006; F15B 9/09; F15B 11/003; F15B 15/18; F15B 2211/20515; F15B 2211/20561; F15B 2211/27
See application file for complete search history.

(56) References Cited

U.S. PATENT DOCUMENTS 8,407,993 B2 * 4/2013 Vigholm ............... E02F 9/2289 60/476
9,506,225 B2 * 11/2016 Kim ........................ F15B 21/08
(Continued)

FOREIGN PATENT DOCUMENTS

DE 10 2011 056 894 A1 11/2012
WO 2020/239258 A1 12/2020

OTHER PUBLICATIONS

Hagen et al., "A Method for Smoothly Disengaging the Load-Holding Valves of Energy-Efficient Electro-Hydraulic Systems," In: Proceedings of the First International Conference on Actuator Technology: Materials, Devices an Applications, Nov. 23-27, 2020, vol. 64, No. 36 (8 pages).

*Primary Examiner* — Michael Leslie
(74) *Attorney, Agent, or Firm* — Maginot, Moore & Beck LLP

(57) ABSTRACT

A hydraulic arrangement includes a hydraulic cylinder and a hydraulic pump for its pressure medium supply, which can be driven by an electric motor of the arrangement and can be fluidically connected to a cylinder chamber via a pressure medium flow path. At least one shutoff valve is provided in the pressure medium flow path, through which the pressure medium flow path can be hydraulically disconnected for load holding of the hydraulic cylinder without drive. An operating variable of the electric motor is determined or detected upon hydraulic disconnection of the pressure medium flow path, and the detected or determined operating variable is set and tracked on the electric motor upon setting a condition at which the pressure medium flow path is opened.

15 Claims, 2 Drawing Sheets

(52) U.S. Cl.
CPC ............... *F15B 2211/20515* (2013.01); *F15B 2211/20561* (2013.01); *F15B 2211/27* (2013.01); *F15B 2211/30515* (2013.01)

(56) References Cited

U.S. PATENT DOCUMENTS

| | | | | |
|---|---|---|---|---|
| 10,138,915 | B2 * | 11/2018 | Bhaskar | E02F 9/2203 |
| 10,309,429 | B2 * | 6/2019 | Gomm | F15B 13/044 |
| 10,808,734 | B2 * | 10/2020 | Zeller | F15B 11/17 |
| 10,851,772 | B2 * | 12/2020 | Junginger | F15B 7/006 |
| 11,137,000 | B2 * | 10/2021 | Chester | F15B 11/003 |
| 11,713,778 | B2 * | 8/2023 | Wang | F15B 21/082<br>60/459 |
| 2008/0295504 | A1 | 12/2008 | Vigholm et al. | |
| 2016/0102685 | A1 | 4/2016 | Chester | |
| 2020/0262677 | A1 | 8/2020 | Samba Murthy | |

* cited by examiner

HYDRAULIC ARRANGEMENT WITH LOAD-HOLDING FUNCTION AND HYDRAULIC ARRANGEMENT CONTROL METHOD

This application claims priority under 35 U.S.C. § 119 to patent application no. DE 10 2022 211 393.4, filed on Oct. 27, 2022 in Germany, the disclosure of which is incorporated herein by reference in its entirety.

BACKGROUND

The present disclosure relates to a hydraulic arrangement, as well as a method for controlling a hydraulic arrangement.

A hydraulic arrangement, for example a hydraulic axle, in particular a linear axle and/or a compact axle, comprises a hydraulic cylinder in a closed or, if differential volume compensation is necessary, in a partially closed hydraulic circuit. The hydraulic cylinder may be configured as a uniform or differential cylinder, as well as a multi-area cylinder. With a low oil volume, the axle can be used to move, press, join, or close with high dynamics, precision, and force. Typical applications for such axles are presses, injection molding machines, hexapods for simulators, or the like. If the axle is configured as a servo-hydraulic axle with a servo drive, it has an extremely high positioning accuracy and also has good electrical/electronic interconnectivity.

The data sheet RD 08137/2018-02 of the Applicant shows a generic servo-hydraulic axle. The compact axle has a servo motor, a hydraulic control block, as well as a hydraulic cylinder, a hydraulic accumulator and control elements such as valves, as well as power electronics. The hydraulic servo-hydraulic axle may be position- and/or force-controlled. In this way, travel-force profiles and travel-time profiles of the axle can be adapted to a particular application.

In order to hold the position of the axle against a load, various modes are known from the prior art. In one mode, the axle remains in its position or force control and the pump is still fluidically connected to the axle. The conveying volume or the speed of the servo motor is controlled in such a way that only the internal leakage of the system—the pump-occurring during the holding of the load is compensated. Another mode is enabled by the use of a load-holding valve that shuts off the pressure medium flow path between the loaded cylinder chamber and the pressure side of the hydraulic pump. In this way, the servo motor can be switched without torque, which reduces the duration of its power consumption and reduces wear. When the load is resumed by the pump, following the position or force secured by the load-holding valve, unintended movement of the axle may occur when the load-holding valve opens if the pressure between the pump and the load-holding valve is not matched to the load on the axle.

U.S. Pat. No. 2,016,010 26 85 A1 shows a servo-hydraulic axle and a method for controlling it when holding the load by means of a pump and by means of a load-holding valve as well as when the load is resumed by the pump after it has been held by a load-holding valve. The initial position is the torque-free servo motor, the idle pump, and the closed load-holding valve which holds the load. A target-actual deviation of the position of the axle is determined continuously. If the deviation is within a 5% tolerance band, the control of the servo motor and the load-holding valve remains unchanged. If the deviation exits the tolerance band, this is the signal for resuming the load by the pump to readjust the target position. For this purpose, a target direction of rotation and a target speed and a corresponding control signal for the servo motor are determined from the deviation. To allow resuming and reaching the target position, the load-holding valve must be actuated or opened. To prevent the undesired movement of the axle described above, the pump pressure on this side of the load-holding valve is first brought up to the load pressure on the other side of load-holding valve. To achieve this, the servo motor is controlled with the previously determined control signal before-after a time constant in the millisecond range has elapsed—the load-holding valve is actuated. The (open) load-holding valve and servo motor (ramping up to target speed) are then controlled simultaneously. When a 5% band of the target position of the axle is reached, this speed ramp is flattened to avoid overshooting. If the new target position is reached and the deviation remains within the 5% tolerance band during a configurable time constant, a) the load-holding valve is closed, and b) the servo motor- and thus the pump—is ramped down to speed 0 at the same time. Thus, the energy-saving load-holding state is resumed by the load-holding valve. According to U.S. Pat. No. 2,016,010 26 85 A1, the signal for load holding by means of a load-holding valve and the signal to resume the load by the pump are both automatic and solely dependent on the actual position of the axle. In addition, a time constant may be effective which delays the switchover to the load-holding mode by means of the load-holding valve, such that the position of the axle may still be held in control mode for a certain time despite the condition being met.

For such a solution, however, on the one hand position detection is a prerequisite, and on the other hand the servo motor must be controlled in a complex manner in order to adjust the pressure levels on both sides of the load-holding valve before the load-holding valve is opened.

In contrast, the object of the disclosure is to provide a hydraulic arrangement that overcomes or at least reduces the disadvantages of the prior art and in particular allows smooth switching from a load-holding mode with simple pressure adjustment.

SUMMARY

The object is achieved by a hydraulic arrangement with the features disclosed herein and by a method as disclosed herein.

The present disclosure relates to a hydraulic arrangement having a hydraulic cylinder and a hydraulic pump for its pressure medium supply, which can be driven by an electric motor, in particular a servo motor or stepper motor, and is fluidically connected to a cylinder chamber via a pressure medium flow path. A shutoff valve is provided in the pressure medium flow path, through which the pressure medium flow path can be hydraulically disconnected for holding a load of the hydraulic cylinder without drive. According to the present disclosure, an operating variable of the electric motor is determined or detected when hydraulically disconnecting the pressure medium flow path, and the detected or determined operating variable is adjusted upon detecting a condition for which the pressure medium flow path or shutoff valve is opened on the electric motor.

The operating variable on the electric motor may be adjusted by a control unit of the hydraulic arrangement. Adjusting means setting a control variable, in particular a control current, and subsequently tracking the electric motor to the control variable.

Thus, the pressure medium flow path between the cylinder chamber and the hydraulic pump can be hydraulically disconnected by the shutoff valve. When the shutoff valve is closed, the hydraulic cylinder may hold a load without requiring power from the hydraulic pump. The shutoff valve thus performs the function of a load-holding valve. Opening the shutoff valve deactivates the load-holding function of the hydraulic arrangement. A control unit of the hydraulic arrangement detects or determines the operating variable of the electric motor during closing of the shutoff valve. When the condition adjusts or detects that the load-holding function is to be ended and fluid is required from the hydraulic pump, the detected or determined operating variable of the electric motor driving the hydraulic pump is set by the control unit. Ending or deactivating the load-holding function of the hydraulic arrangement thus corresponds to a resumption of the load by the hydraulic pump following holding by means of a load-holding valve.

In other words, the shutoff valve in the pressure medium flow path can be controlled via a control unit of the arrangement as a function of at least the detected or determined operating variable of the arrangement. The at least one operating variable is an operating variable of the electric motor.

The load on the motor pump unit or the operating variable of the electric motor can thus be saved and reduced in a controlled manner at the time of shutting off the shutoff valve as a reference for resumption, in order to be raised again upon resumption to the value of the operating variable upon shutting off or tracked to the current state without a significant change in pressure or movement occurring in the loaded cylinder chamber.

Preferably, the detected or determined operating variable of the electric motor is adjusted before the shutoff valve is opened and a fluidic connection is established between the hydraulic cylinder and the hydraulic pump.

The hydraulic arrangement has the following advantages. By setting the detected or determined operating variable prior to opening the shutoff valve, the electric motor and thereby the hydraulic pump are adjusted to the load level or the pressure level in the cylinder chamber. This avoids a discontinuity in force or position due to a sudden adjustment of the different pressure levels when the shutoff valve is opened. Since the electric motor is controlled or regulated by an operating variable of the electric motor, the control is easier to design and less prone to errors. Furthermore, force, position, and/or pressure sensors are not necessarily required in the cylinder chamber. Thus, costs can be saved.

The object of the present disclosure is further achieved by a method for controlling a hydraulic arrangement with a hydraulic cylinder and a hydraulic pump. The method according to the disclosure has the following steps: The shutoff valve in the pressure medium flow path between the hydraulic cylinder and the hydraulic pump of the hydraulic arrangement is closed. During closure of the shutoff valve, the operating variable of the electric motor driving the hydraulic pump is determined or detected. In a next step, it is detected that there is a condition for a resumption (of the load by the hydraulic pump). The determined or detected operating variable is then set on the electric motor. The last step is to open the shutoff valve.

Closing the shutoff valve switches the hydraulic arrangement to the load-holding mode. When the load-holding function is deactivated, the determined or detected operating variable on the electric motor may first be set and then the shutoff valve may be opened. The determined or detected operating variable may in particular represent the load on the hydraulic pump and thus the electric motor.

In the case of resumption, this is the deactivation of the load-holding function and thus the (time-delayed) opening of the shutoff valve. By resuming, the hydraulic cylinder is once again in the control (of the control unit of the hydraulic arrangement).

In particular, the method according to the disclosure adjusts the load or pressure level of the cylinder chamber and the hydraulic pump to one another before the shutoff valve opens. The adjusted pressure levels on both sides of the shutoff valve prevent unwanted movement of the cylinder piston when the shutoff valve is opened.

Advantageous further embodiments of the present disclosure are the subject of the accompanying subclaims.

Preferably, the operating variable of the electric motor is proportional to a pressure in the cylinder chamber. The operating variable may thus indicate the load on the electric motor during hydraulic disconnection of the fluid line by the shutoff valve. The load on the electric motor may be dependent on the pressure in the cylinder chamber. The operating variable, which is proportional to the pressure in the cylinder chamber, may therefore be a measure of the load on the electric motor. As an operating variable of the electric motor is determined or detected, a pressure measurement in the cylinder chamber is optional. As the operating variable of the electric motor may be detected on the electric motor, the control or activation of the electric motor can be kept simpler.

According to an optional feature of the present disclosure, the operating variable of the electric motor can be determined from its load or is determined from its load. Thus, the load on the electric motor may represent a load on the electric motor of the hydraulic pump.

Preferably, the operating variable of the electric motor may be determined from its current consumption or is determined from its current consumption. The current consumption of the electric motor can easily be detected. With known current consumption of the electric motor, the torque of the electric motor may be determined. The pressure in the cylinder chamber or the force on the cylinder can thus be determined by detecting the current consumption. This could eliminate the need for sensors in the cylinder chamber, which could save costs. Furthermore, the pressure in the cylinder chamber or the force on the cylinder could be influenced by a control current of the electric motor.

According to another optional feature of the present disclosure, the operating variable of the electric motor is its torque. The torque of the electric motor may be proportional to the pressure in the cylinder chamber and may be calculated from the known operating variables of the electric motor. The torque as the operating variable may thus indicate the load on the electric motor.

The load-holding function may be deactivated by a condition. Various operations or events may be considered as a condition for deactivating the load-holding function.

With the shutoff valve open, a hydraulic/fluidic connection may be made between the hydraulic cylinder and the hydraulic pump. Thus, a control unit of the hydraulic arrangement may regulate or control a movement, pressure, and/or position of the hydraulic cylinder by a control current of the electric motor driving the hydraulic pump. When the shutoff valve is closed, the fluidic connection may be disconnected and the hydraulic cylinder may no longer be controlled. Deactivating the load-holding function may thus correspond to opening the shutoff valve and thereby a resumption of control by the control unit.

Preferably, the condition is that the load-holding function is deactivated.

Deactivating the load-holding function may be time controlled or may be initiated by a user. For example, the condition may be the command to deactivate the load-holding function.

The condition may further be an input of a control word. The control word may be used to manually instruct the user to deactivate the load-holding function and thus to resume the control.

According to a further optional feature of the present disclosure, the condition may be the pressure and/or force exiting a predetermined range. When the force on the cylinder and/or the pressure in the cylinder chamber is detected, a deviation from the target value that is greater than a predetermined tolerance deviation may be the condition for deactivating the load-holding function. It may be advantageous that the actual pressure in the cylinder chamber or the actual force on the cylinder need not be determined from the operating variable of the electric motor and thus no deviations occur due to the determination in the control.

Loss of pressure in the cylinder chamber or changes in force on the cylinder could occur, for example, due to leakage at the shutoff valve or changes in load on the cylinder. If the pressure in the cylinder chamber or the force on the cylinder drops below a pre-defined limit value, this can cause the shutoff valve to be opened, in order to increase or reduce the pressure in the cylinder chamber with the aid of the hydraulic pump. Thus, a decrease or increase in cylinder chamber pressure below or above an allowable level is prevented.

Preferably, the condition may be that a position of the hydraulic cylinder or a piston rod of the hydraulic cylinder is outside of a predetermined range. If the position of a cylinder piston or piston rod is detected, a deviation of the piston position that exceeds a predefined tolerance deviation may trigger a deactivation of the load-holding function. Thus, undesirable piston movements, and thus a decrease/increase in cylinder pressure, may be detected and avoided.

According to a further optional feature of the present disclosure, the condition may be a change to a position target value of the hydraulic cylinder or the piston rod of the hydraulic cylinder. If a user enters or requests a new target value for the position of the cylinder piston, then the load-holding function may be deactivated to move the hydraulic cylinder to the new target value with the aid of the hydraulic pump. Thus, the hydraulic arrangement may respond to user inputs in a timely manner.

If the condition has occurred, the detected or determined or tracked operating variable of the electric motor is first set and then the shutoff valve is opened. Thus, a hydraulic connection may be established between the hydraulic cylinder and the hydraulic pump. The load-holding function is then deactivated and the axle is in the control.

Optionally, prior to the first step of shutting off the pressure medium flow path by the shutoff valve, it may be queried whether there is any condition at all for activating the load-holding function. Only when activation of the load-holding function would be requested by reaching a predetermined pressure in the cylinder chamber and/or by a manual control word could the shut-off valve be closed and, in particular, the pressure medium flow path be shut off.

Preferably, a pressure in the pressure medium flow path(s) is detected during closure of the shutoff valve. For example, the pressure may be detected by pressure sensors in the pressure medium flow path(s). The pressure detected upon shutting off the shutoff valve could be a reference to which the electric motor and thus the hydraulic pump are set when control is resumed or the load-holding function is deactivated.

According to a further optional feature of the present disclosure, the control of the hydraulic cylinder acts during the closure of the at least one shutoff valve. With the shutoff valve open, a hydraulic/fluidic connection may be made between the hydraulic cylinder and the hydraulic pump. Thus, the control unit may control the hydraulic cylinder by a control current of the electric motor driving the hydraulic pump. As long as the shutoff valve is not fully closed, the control of the control unit acts on the hydraulic cylinder. Thus, it may be possible to detect or determine the operating variable of the electric motor during closure of the shutoff valve.

Preferably, the control of the hydraulic cylinder with the aid of the hydraulic pump or electric motor is ended after closing the shutoff valve. When the shutoff valve is closed, the hydraulic arrangement is in load-holding mode. The hydraulic/fluidic connection between the hydraulic cylinder and the hydraulic pump may be interrupted. Thus, it may be impossible to control the hydraulic cylinder via the (actuation of the) hydraulic pump.

Preferably, the operating variable of the electric motor is reduced after the shutoff valve has been closed. In particular, the torque and thus the load on the electric motor is reduced by a torque control following a profile for reducing the load on the electric motor. By reducing the operating variable, in particular the torque, of the electric motor, energy is saved during load-holding mode.

Complete closure of the at least one shutoff valve may be ensured either by time control or by position monitoring. Closure of the shutoff valve may be a condition that the operating variable of the electric motor is reduced.

According to a further optional feature of the present disclosure, the operating variable, in particular the torque, of the electric motor is increased to the detected or determined or tracked value of the operating variable upon occurrence of the condition when the shutoff valve is closed.

Preferably, the operating variable of the electric motor, in particular the torque, is increased before the shutoff valve opens.

Preferably, the operating variable is stored in a memory unit of the control unit of the hydraulic arrangement when the shutoff valve closes. In particular, the torque of the electric motor, and thus the load on the electric motor, is stored when the shutoff valve closes. The stored value may be retrieved and optionally tracked when the condition occurs and the operating variable may be increased until the stored value is reached.

DETAILED DESCRIPTION

Figure 1:
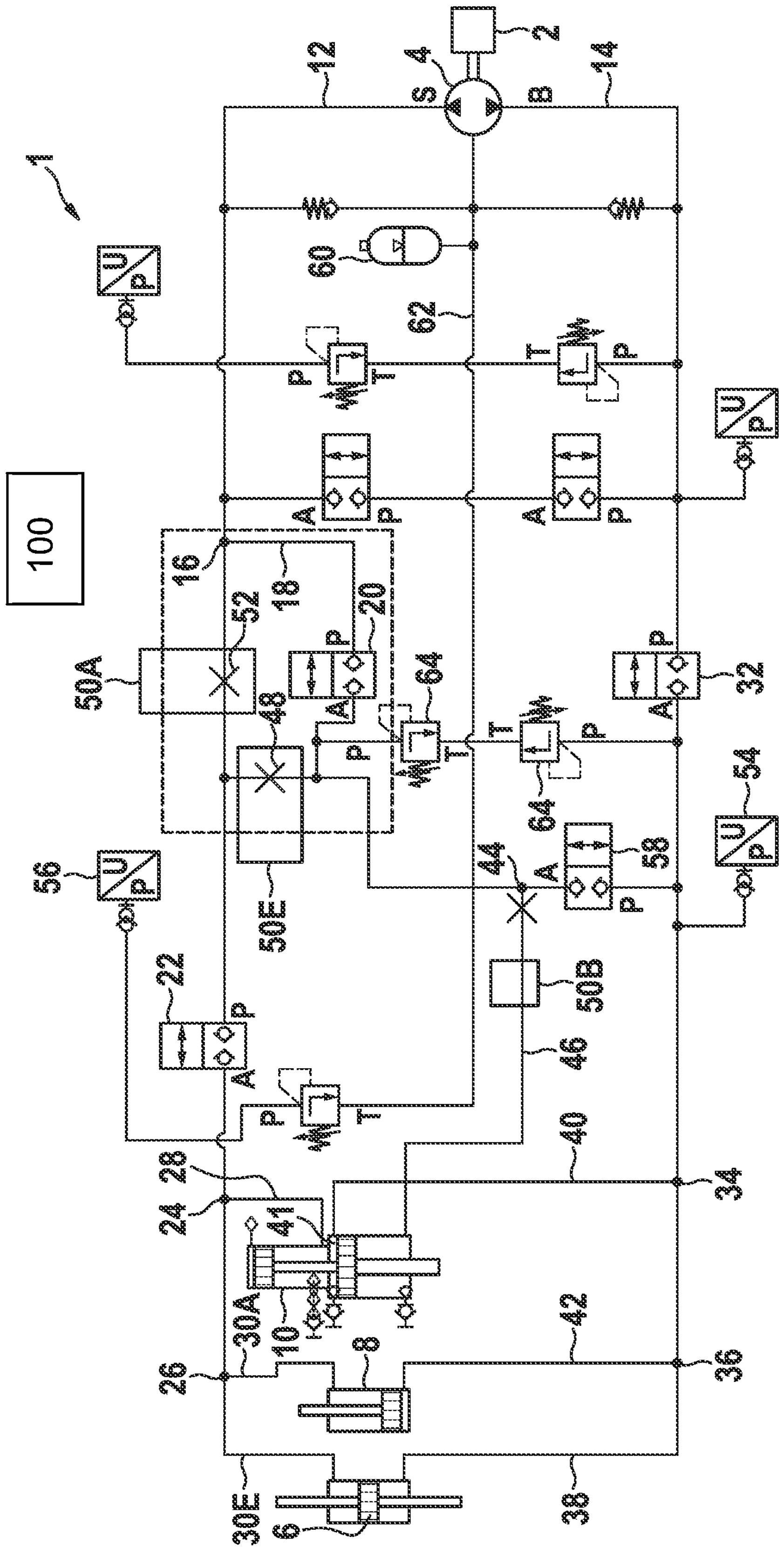
FIG. 1 shows a hydraulic arrangement in accordance with the present disclosure.

A hydraulic arrangement 1 according to FIG. 1 has a hydraulic pump or machine 4 driven by an electric motor 2 and at least one of three hydraulic cylinders 6, 8, and 10 supplied with pressure medium by the hydraulic pump 4. Basic features of the hydraulic arrangement 1 are known from WO 2020/260 124 A1. Accordingly, the differences from WO 2020/260 124 A1 are discussed.

A first working flow path 12 and a second working flow path 14 proceed from the hydraulic pump 4. The first working flow path 12 has a branch 16 where a third working flow path 18 branches off. In this, a shutoff valve 20, which is configured as a 2/2-way switching valve, is arranged and controlled by a control unit 100 of the hydraulic arrangement.

Starting from the branch 16, the first working flow path 12 extends further, wherein a further shutoff valve 22 is arranged, via which the first working flow path 12 can be shut off. Also, the shutoff valve 22 is simply configured as 2/2-way switching valves actuated by the control unit 100 in terms of apparatus technology.

Continuing the first working flow path 12, this has branches 24 and 26. A work connection 28 branches off from branch 24, and work connections 30E and 30A branch off from branch 26.

A shutoff valve 32 is arranged in the second working flow path 14, via which the second working flow path 14 can be shut off. The second working flow path 14 continues via the shutoff valve 32 to a branch 34. A work connection 40 branches off from the branch 34. Starting from the branch 34, the second working flow path 14 extends to a branch 36. Work connections 38, 42 branch off from the branch 36.

The third working flow path 18 is continued beyond the shutoff valve 20, up to a branch 44, from which a third work connection 46 branches off to the hydraulic cylinder 10. The third work connection 46 can be connected by a (switchable) configuration 50B.

In the hydraulic arrangement 1, the hydraulic cylinders 6, 8 with two piston surfaces or the hydraulic cylinder 10 with three piston surfaces may optionally be supplied with pressure medium depending on the configuration.

A connection flow path 48 is provided for this purpose, via which the first working flow path 12 can be fluidically connected to the third working flow path 18 downstream of the shutoff valve 20. A receptacle 50E is provided in connection flow path 48. A receptacle 50A configured the same in the exemplary embodiment is provided in the first working flow path 12 in a section between the branch 16 and a confluence of the connection flow path 48.

A sealing means 52 configured as a screw, in particular M18×1.5 (in this case in accordance with DIN906,) can be inserted or is inserted into the respective receptacle 50E, 50B, 50A. Due to the same design of the receptacles 50E, 50A with M18 threads in the exemplary embodiment, the exactly one sealing means 52 may be inserted into the corresponding receptacle 50E, 50A depending on the desirable configuration E, A.

The circuit structure is configurable by the sealing means 52. A detailed explanation of the circuit structure of the hydraulic arrangement is described in WO 2020/260 124 A1 and is therefore omitted here. The receptacles 50A, 50B, and 50E and thus the configurations A1 and E1 are optional.

The second working flow path 14 comprises a pressure sensor 54 downstream of the shutoff valve 32. The pressure sensor is optional. The pump-side part of the hydraulic arrangement 1 also comprises an optional pressure sensor 56. The work connections 40 and 46 are fluidically connected via the shutoff valve 58 and may be shorted.

To enable a load-holding function of the hydraulic arrangement 1, one of the shutoff valves 20, 22, 32, and 58 may shut off the fluidic line or pressure medium flow path between the hydraulic pump 4 and the respective hydraulic cylinder 6, 8, and 10 respectively. For example, in a configuration A, the work connection 28 may be shut off by shutoff valve 20, and in a configuration E, the work connection 28 may be shut off by shutoff valve 22. Thus, the respective hydraulic cylinders 6, 8, and 10 may hold a load without the need to be driven by the hydraulic pump 4.

To accommodate differential volumes resulting from different piston surface sizes of the hydraulic cylinders 6, 8, 10, the hydraulic arrangement has a storage flow path 62 which can be fluidically connected to the respective working flow path 12, 14 via pressure relief valves 64 preset to a pressure value. A gas-loaded hydraulic accumulator 60 is connected to the accumulator flow path 62.

The following operation may be performed with each of the shutoff valves 20, 22, 32, 58 controlled by control unit 100. For ease of understanding, the shutoff valve 32 is considered as an example.

For example, the work connection 40 is fluidically disconnected from the hydraulic pump 4 via the shutoff valve 32. Thus, the load-holding function is enabled, by which a load on the hydraulic cylinder 10 can be held without drive. If the load-holding function is active, the hydraulic pump 4 and thus the electric motor 2 can be switched off or the load of the electric motor 2 can be reduced by the control unit 100. The timing of closing the shutoff valve 32 and reducing the torque of the electric motor 2 is illustrated in FIG. 2.

Figure 2:
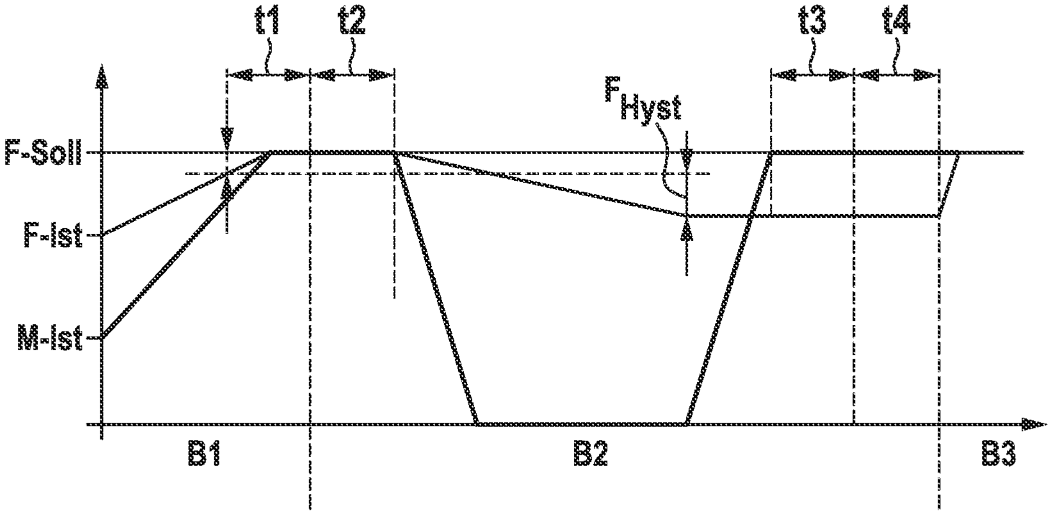
FIG. 2 shows a time course of a force of a hydraulic cylinder and a torque of an electric motor.

FIG. 2 illustrates by way of example a time course of a force on the hydraulic cylinder 10 or a pressure in the cylinder chamber 41 of the hydraulic cylinder 10 and a torque of the electric motor 2. The basic timing is identical for all other work connections and cylinder chambers of the hydraulic cylinders 6, 8, and 10. The pressure in the cylinder chamber 41 is detected by, for example, a pressure sensor 54 in the cylinder chamber 41. In a first region B1, the shutoff valve 32 is open. With the valve 32 open, there is a fluidic connection between the hydraulic cylinder 6 and the hydraulic pump 4. By this, the hydraulic cylinder 10 can be controlled by the control unit via a control current of the electric motor 2 driving the hydraulic pump 4.

The hydraulic cylinder 10 can thus be controlled with the open shutoff valve 32 via the control unit 100 of the hydraulic arrangement 1. The load-holding function is thus not active in this range. The external load increases the torque of the electric motor 2. The load on the hydraulic pump 4 thus increases and the pressure in the cylinder chamber 41 increases. The torque of the electric motor 2 is increased until the detected force first reaches a force target value Fsoll or a predetermined tolerance range near the force target value Fsoll and optionally a detected position reaches a position target value xsoll or a predetermined tolerance range near the position target value xsoll.

The load-holding function may thus be activated by a detected signal detected by the control unit 100. For example, the detected signal may be the detected force on the hydraulic cylinder 10 that lies in a predefined target range while at the same time optionally reaching a position in a predefined target range of the hydraulic cylinder 10 while at the same time reaching a predetermined torque on the electric motor 2. Furthermore, the activation of the load-holding function may be performed by a manual command via a control word.

If the detected force first and optionally the detected position xist reaches the predetermined tolerance range, a time t1 begins to run. The predetermined tolerance range may be, for example, a certain percentage of the target force value to be achieved, optionally the target position value. The time t1 is referred to as debounce time. The debounce time is to prevent the hydraulic arrangement 1 from reacting to short-term force/position variations. When time t1 has elapsed, the load-holding function is activated. The shutoff valve 32 closes. The closing operation of the shutoff valve 32 requires the time period t2. When the shutoff valve 32 is fully closed, i.e., in the second region B2, the cylinder piston is no longer controlled via the control unit of the hydraulic arrangement 1. The fluidic passage between the hydraulic pump 4 and the hydraulic cylinder 10 is thus hydraulically disconnected by the shutoff valve 32. The torque of the electric motor 2 is subsequently reduced to zero. The control of the electric motor 2 by the control unit 100 follows a predetermined profile for reducing the load or torque.

Leakage of the shutoff valve 32 and simultaneous pressing load on the cylinder 10 or other pressure losses may slowly decrease the applied force on the hydraulic cylinder 10 during the active load-holding mode in the range B2. If the force changes outside of a predetermined (limit) range, the load-holding function is deactivated. An additional hysteresis adjustment Fhyst may be incorporated into the predetermined limit range.

Optionally, the position of the cylinder 10 may also be detected by a position sensor (not shown). If the cylinder position exits a predetermined (limit) range due to (undesired) movement caused by leakage, a signal for deactivating the load-holding function may thereby be given. An additional hysteresis adjustment xhyst may be incorporated into the predetermined limit range.

If the load-holding function is deactivated, the torque of the electric motor 2 is increased to the last (detected) value, or optionally tracked to the current load situation prior to closing the shutoff valve 32. If the torque reaches the target value, a time period t3 is waited for. The time period t3 is to ensure that the desired torque is set, but may also be 0 seconds. The shutoff valve 32 is then opened. The opening operation of the shutoff valve 32 requires a time period t4. When the shutoff valve is open, a fluidic connection between the hydraulic cylinder 10 and the hydraulic pump 4 is restored. The commanded force and/or position is restored. The force on the hydraulic cylinder 10 thus rises to the target value or the position is adjusted to the target value again. As the torque of the electric motor 1 has been increased prior to opening the shutoff valve 32, the pressure in the corresponding lines is adjusted before opening the shutoff valve 32 or tracked to the current load on the chamber. From the time the shutoff valve 32 is completely open, the hydraulic cylinder is controlled again by the control unit. The load-holding function is thus completely deactivated. The third region B3 is thus reached.

For example, the last detected value of the electric motor 2 may be the detected torque of the electric motor 2 upon closing of the shutoff valve 32, and optionally adjusted or tracked to the current load situation. This value may be stored in a memory unit of the control unit 100 and retrieved upon increasing the torque.

However, it is also conceivable that the electric motor 2 is controlled upon resumption of the hydraulic pump 4 via the detected pressure on the pump side of the hydraulic arrangement 1. In this case, there would have to be a pressure sensor on the cylinder side and on the pump side respectively, in order to adjust the respective pressures to one another before opening the shutoff valve.

Figure 3:
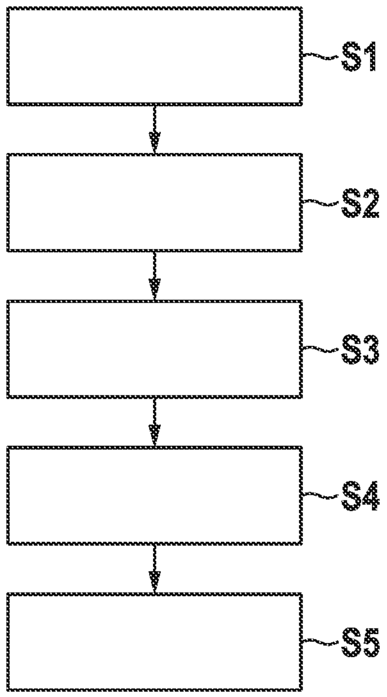
FIG. 3 shows a flow chart of a method for controlling the hydraulic arrangement according to the present disclosure.

FIG. 3 shows a flow chart of a method for controlling the hydraulic arrangement 1 with the hydraulic cylinders 6, 8, 10, and the hydraulic pump 4 as disclosed herein. In step S1, the shutoff valve 32 is closed in the working flow path or the pressure medium flow path 14 between the hydraulic cylinder 10 and the hydraulic pump 4. The closure of the shutoff valve 32 requires the time period t2. In step S2, an operating variable of the electric motor 2 driving the hydraulic pump 4 is determined or detected during the closure of the shutoff valve 32. This may be either a torque of the electric motor 2 or a pressure in the cylinder chamber 41. For example, the determined or detected operating variable may be stored in a storage unit of the control unit 100 of the hydraulic arrangement 1. In step S3, it is determined whether there is a condition for deactivating the load-holding function or for resuming the control. In step S4, the determined or detected operating variable is adjusted on the electric motor 2. That is, for example, the electric motor 2 increases its torque until the torque is applied that was determined or detected when the shutoff valve 32 was closed. In step S5, the shutoff valve 32 is opened. Thus, the load-holding function is deactivated. When the shutoff valve 32 is open, the hydraulic cylinder 6 is controlled again by the control unit of the hydraulic arrangement 1.

Prior to step S1, an optional step S0 may be performed, in which it is checked (by the control unit 100) whether there is a condition for activating the load-holding function. This condition may be an automatic detection of whether the pressure medium flow path is to be shut off when a predetermined force or pressure range is reached. Reaching the predetermined force or pressure range may be detected by the sensors in the pressure medium flow path. The condition for activating the load-holding function may further be performed by a manual command via a control word.

For example, the condition for deactivating the load-holding function may be a manual deactivation of the load-holding function. It may further be a control word with which a resumption of the control is arranged. The condition may also be, for example, that a detected force on the hydraulic cylinder or a pressure in the cylinder chamber exits a predetermined tolerance range. Furthermore, the condition may be that a detected position of the cylinder piston exits a predetermined tolerance range. Also, a change to a position target value of the cylinder piston may be a condition for deactivating the load-holding function.

The procedure of the control method according to the disclosure is set out in detail below. At the beginning, the load-holding function is deactivated. Shutting off the shutoff valve 32 is then activated either automatically or manually, and thereafter the shutoff valve 32 is closed. Complete closure of the shutoff valve 32 may be time monitored or realized via position monitoring. When the shutoff valve 32 is fully closed, the hydraulic cylinder 10 is taken out of the control and the torque of the electric motor 2 is reduced to 0 Nm in a controlled manner.

If the load-holding function is deactivated when the load-holding function is active or if a resumption of the control of the hydraulic cylinder 10 is requested, the torque of the electric motor 2 is increased. If the load-holding function is not deactivated, it is first checked whether the position target value of the cylinder piston has been changed. If this is the case, it is checked whether automatic travel movement of the cylinder piston is desired. The pressure in the line 14 is adjusted to the pressure of the line run 41 before closing the shutoff valve 32, or is tracked to the current load on the chamber. If automatic travel movement of the cylinder piston is desired, changing the position target value of the cylinder piston for the resumption duration may be ignored. In this case, the change in the position target value of the cylinder piston is not active until the shutoff valve 32 is fully open. After the resumption command is activated, the torque of the electric motor 2 is increased. A wait time t3 may be waited for. This may ensure that the torque corresponds to the target value.

The shutoff valve 32 is then opened. The opening duration of the shutoff valve 32 may require a time period t4. After fully opening the shutoff valve 32, the hydraulic cylinder 10 is again in the control of the hydraulic arrangement 1. A change in target value of the position of the cylinder piston is active and is no longer ignored. The load-holding function is thus completely deactivated.

What is claimed is:

1. A hydraulic arrangement, comprising:

a hydraulic cylinder;

a hydraulic pump configured to supply pressure medium to the hydraulic cylinder, the hydraulic pump driven by an electric motor, and the hydraulic pump fluidically connected to a cylinder chamber of the hydraulic cylinder via a pressure medium flow path, one or more shutoff valves are provided in the pressure medium flow path through which the pressure medium flow path is hydraulically disconnected for holding a load of the hydraulic cylinder without drive from the electric motor; and a control unit for controlling the electric motor and the one or more shutoff valves, wherein the control unit is configured and operable to;

determine or detect an operating variable of the electric motor upon hydraulic disconnection of the pressure medium flow path, and adjust the electric motor to the detected or determined operating variable based on setting a condition at which the pressure medium flow path is opened.

2. The hydraulic arrangement according to claim 1, wherein the operating variable of the electric motor is proportional to a pressure in the cylinder chamber.

3. The hydraulic arrangement according to claim 1, wherein the operating variable of the electric motor is determined from a load of the electric motor.

4. The hydraulic arrangement according to claim 1, wherein the operating variable of the electric motor is determined from a current consumption of the electric motor.

5. The hydraulic arrangement according to claim 1, wherein the operating variable of the electric motor is a torque of the electric motor.

6. The hydraulic arrangement according to claim 1, wherein:

the operating variable of the electric motor is a detected pressure in the pressure medium flow path, and the electric motor is set such that the detected pressure is applied upon opening of the pressure medium flow path.

7. The hydraulic arrangement according to claim 1, wherein the condition is a deactivation of a load-holding function.

8. The hydraulic arrangement according to claim 1, wherein the condition is a manually set control word.

9. The hydraulic arrangement according to claim 1, wherein the condition is that a detected force on the hydraulic cylinder or pressure in the cylinder chamber is outside of a predetermined tolerance range.

10. The hydraulic arrangement according to claim 1, wherein the condition is that a detected position of the hydraulic cylinder is outside of a predetermined tolerance range.

11. The hydraulic arrangement according to claim 1, wherein the condition is a change of a position target value of the hydraulic cylinder.

12. A method for controlling a hydraulic arrangement having a load-holding function with at least one hydraulic cylinder and a hydraulic pump, the method comprising:

closing a shutoff valve in a pressure medium flow path between the hydraulic cylinder and the hydraulic pump;

determining or detecting an operating variable of an electric motor driving the hydraulic pump during closure of the shutoff valve;

detecting that there is a condition for deactivating the load-holding function;

setting and tracking the determined or detected operating variable on the electric motor; and opening the shutoff valve.

13. The method according to claim 12, wherein the hydraulic cylinder is controlled by a control unit of the hydraulic arrangement while the shutoff valve closes.

14. The method according to claim 13, wherein a control of the hydraulic cylinder by the control unit is ended after the shutoff valve is fully closed.

15. The method according to claim 12, wherein an operational size torque of the electric motor is reduced after the shutoff valve is fully closed.

* * * * *